United States Patent Office 3,031,481
Patented Apr. 24, 1962

3,031,481
3-HYDROXY-3-(n-BUTYL)-7,11-DIMETHYL-DODECANOIC ACID
William A. Bolhofer, Frederick, Pa., assignor to Merck & Co., Inc., Rahway, N.J., a corporation of New Jersey
No Drawing. Filed Jan. 18, 1960, Ser. No. 2,854
3 Claims. (Cl. 260—413)

This invention relates to a novel composition of matter and to a method for preparing it. In particular, the invention relates to 3-hydroxy-3-(n-butyl)-7,11-dimethyl-dodecanoic acid having the structural formula:

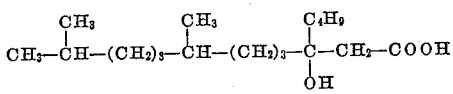

as well as to the alkali metal and alkaline earth metal salts thereof.

3-hydroxy-3-(n-butyl)-7,11-dimethyldodecanoic acid has been found to inhibit the biosynthesis of cholesterol in liver homogenates in vitro and accordingly the acid and its salts which, in vivo, would hydrolyze to the free acid, are potentially useful in lowering blood cholesterol levels in humans which is considered an important function of chemotherapeutic agents for the treatment of atherosclerosis.

The 3-hydroxy-3-(n-butyl)-7,11-dimethyldodecanoic acid of this invention and its salts can be prepared by various methods. A process which has been found to be particularly well adapted to the preparation of these compounds is the Reformatsky reaction which employs readily available intermediates which can be reacted with a minimum of difficulty. This process comprises reacting an alpha haloacetate, such as a lower alkyl chloro-, bromo- or iodoacetate with allylpseudoionone in the presence of zinc.

The reaction is preferably carried out in the presence of an anhydrous organic solvent which is non-reactive with the reactants, such as anhydrous benzene, ethyl ether, butyl ether, toluene, xylene or mixtures thereof and at room temperature. The reaction, if desired, also can be initiated by the addition of a catalytic amount of iodine, amalgamated zinc or methylmagnesiumiodide and the yields improved by heating, preferably under reflux conditions, after the exothermic reaction between the reactants has subsided.

The intermediate zinc compound formed by the Reformatsky reaction is hydrolyzed by the addition of dilute acid, preferably a dilute mineral acid, and the ester of the unsaturated acid thus formed extracted or separated from the organic layer by distillation. The product thus obtained is reduced by catalytic hydrogenation and the ester then saponified with a base selected from an alkali metal or alkaline earth metal base to form the corresponding salt which can be hydrolyzed to the free acid.

Alternatively, the alkali metal or alkaline earth metal salts can be prepared by known methods such as by neutralizing the free acid with the selected base, converting a water soluble salt, such as a sodium salt, to an insoluble salt by reaction with, e.g. calcium chloride, and the like.

The preparation of these compounds is more fully described in the following examples. It is to be understood, however, that the examples are illustrative of the method employed for their preparation and are not to be construed as limiting the invention to the particular reaction conditions specifically described.

EXAMPLE 1

*3-Hydroxy-3-(n-Butyl)-7,11-Dimethyldodecanoic Acid*

Step A.—Dry, acid washed, granular zinc (49 g.) and a small crystal of iodine are placed in a three-necked flask fitted with a reflux condenser with calcium chloride drying tube, a stirrer, a dropping funnel and a heating mantle. A solution of 5 ml. of ethyl bromoacetate in 20 ml. of benzene is added and the mixture heated until a vigorous reaction commences. Immediately, the addition of a solution of 116 g. allylpseudoionone and 104 g. of ethyl bromoacetate in 350 ml. of anhydrous ether is begun. The addition is continued at a rate to maintain rapid refluxing without external heating. After 45 minutes, the addition is complete and the reaction mixture is stirred and heated under reflux for an additional two hours. The reaction mixture is cooled to room temperature and then poured into a well-stirred solution of 50 ml. of glacial acetic acid in 350 ml. of water at 0° C. The ethereal phase is separated and then extracted with saturated sodium bicarbonate solution and water. Removal of the ether in vacuo yields ethyl 3-hydroxy-3-(3-butenyl)-7,11-dimethyl-4,6,10-dodecatrienoate as a viscous orange-yellow liquid.

Step B.—A solution of 32 g. of this unsaturated hydroxy ester in 200 ml. of absolute ethyl alcohol is hydrogenated at a pressure of two atmospheres using 5 g. of 10% palladium on charcoal as catalyst until about 93% of theory of hydrogen is absorbed. After elimination of the catalyst by filtration, the ethyl alcohol is removed under reduced pressure and the product distilled at 0.2 mm. pressure. Pure ethyl 3-hydroxy-3-(n-butyl)-7,11-dimethyldodecanoate having $n_D^{25}$ of 1.4465 is collected at 136–140° C.

Analysis calculated for $C_{20}H_{40}O_3$: C, 73.12; H, 12.27. Found: C, 73.14; H, 12.36.

Step C.—Ethyl 3-hydroxy-3-(n-butyl)-7,11-dimethyl-dodecanoate (19.6 g.) is dissolved in 85 ml. of 90% ethyl alcohol containing 4.3 g. of potassium hydroxide. The resulting solution is allowed to stand for 72 hours at room temperature. Water (125 ml.) is added to the alkaline solution and the alcohol is removed by vacuum concentration. The residual aqueous solution is extracted with ether and then acidified with concentrated hydrochloric acid. An oil separates which is extracted with ether. The ethereal extract is dried by stirring with anhydrous sodium sulfate, after which the ether is removed by vacuum concentration yielding 3-hydroxy-3-(n-butyl)-7,11-dimethyldodecanoic acid as a pale yellow liquid which is distilled in a short path still at 170–175° C. (at 0.1 mm. pressure). The pure product has an index of refraction ($n_D^{25}$) of 1.4573.

Analysis calculated for $C_{18}H_{36}O_3$: C, 71.95; H, 12.08. Found: C, 72.10; H, 11.99.

EXAMPLE 2

*Sodium Salt of 3-Hydroxy-3-(n-Butyl)-7,11-Dimethyl-dodecanoic Acid*

Sodium hydroxide solution is added with stirring to a mixture of 3-hydroxy-3-(n-butyl)-7,11-dimethyldodecanoic acid in water until all of the oil dissolves in the form of the sodium salt which can be isolated by evaporation of the water.

EXAMPLE 3

*Calcium Salt of 3-Hydroxy-3-(n-Butyl)-7,11-Dimethyl-dodecanoic Acid*

Calcium chloride is added slowly and with stirring at about 40° C. to an aqueous solution of the sodium salt obtained as described in Example 2, thus precipitating the insoluble calcium salt which is separated by filtration.

While the above examples describe the preparation of certain specific compounds, it is to be understood that the invention is not limited by these examples or by the specific reaction conditions described for the preparation of the compounds, but is understood to embrace variations and modifications falling within the scope of the appended claims.

What is claimed is:
1. A compound selected from the group consisting of 3-hydroxy-3-(n-butyl)-7,11-dimethyldodecanoic acid and the alkali metal and the alkaline earth metal salts thereof.
2. 3-hydroxy-2-(n-butyl) - 7,11 - dimethyldodecanoic acid.
3. Calcium salt of 3-hydroxy-3-(n-butyl)-7,11-dimethyldodecanoic acid.

References Cited in the file of this patent
UNITED STATES PATENTS
2,928,854  Bolhofer _____ Mar. 15, 1960

OTHER REFERENCES
Shriner in Organic Reactions, vol. 1, pages 1 to 34 (pages 2–5 and 23–32, particularly relied upon), 1942, John Wiley, New York.